US007391794B2

(12) United States Patent
Kane

(10) Patent No.: US 7,391,794 B2
(45) Date of Patent: Jun. 24, 2008

(54) INJECTION SEEDING OF FREQUENCY-CONVERTED Q-SWITCHED LASER

(75) Inventor: Thomas J. Kane, Menlo Park, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 301 days.

(21) Appl. No.: 11/136,884

(22) Filed: May 25, 2005

(65) Prior Publication Data

US 2006/0268950 A1 Nov. 30, 2006

(51) Int. Cl.
*H01S 3/11* (2006.01)
*H01S 3/10* (2006.01)

(52) U.S. Cl. .............................. 372/10; 372/11; 372/12; 372/13; 372/21; 372/22

(58) Field of Classification Search ............. 372/10–12, 372/21–22
See application file for complete search history.

(56) References Cited

U.S. PATENT DOCUMENTS

| | | | | |
|---|---|---|---|---|
| 3,609,389 A | 9/1971 | Bjorkholm | | 359/330 |
| 3,764,937 A | 10/1973 | Skolnick et al. | | 331/94.5 |
| 3,815,046 A | 6/1974 | Johnson et al. | | 372/12 |
| 4,329,664 A | 5/1982 | Javan | | 332/7.51 |
| 4,572,662 A | 2/1986 | Silverman | | 356/5 |
| 4,630,275 A * | 12/1986 | Rapoport | | 372/13 |
| 4,737,958 A | 4/1988 | Sizer, II | | 372/18 |
| 4,739,507 A * | 4/1988 | Byer et al. | | 372/22 |
| 4,744,650 A | 5/1988 | Becker et al. | | 352/84 |
| 4,749,961 A | 6/1988 | Kato et al. | | 331/14 |
| 4,834,945 A | 5/1989 | Becker et al. | | 422/68 |
| 4,890,289 A | 12/1989 | Basu et al. | | 372/33 |
| 4,901,322 A | 2/1990 | Kangas | | 372/20 |
| 4,914,663 A * | 4/1990 | Basu et al. | | 372/18 |
| 4,918,704 A * | 4/1990 | Caprara et al. | | 372/99 |
| 4,955,034 A | 9/1990 | Scerbak | | 372/94 |
| 5,022,033 A | 6/1991 | Hackell | | 372/25 |
| 5,081,630 A | 1/1992 | Lowenthal et al. | | 372/20 |
| 5,119,382 A | 6/1992 | Kennedy et al. | | 372/11 |
| 5,121,389 A | 6/1992 | Faulkner | | 370/452 |
| 5,136,596 A | 8/1992 | Rao et al. | | 372/20 |
| 5,317,376 A | 5/1994 | Amzajerdian et al. | | 356/28.5 |
| 5,339,323 A * | 8/1994 | Hunter et al. | | 372/25 |
| 5,394,413 A | 2/1995 | Zayhowski | | 372/10 |
| 5,412,673 A | 5/1995 | Caprara et al. | | 372/19 |
| 5,654,973 A | 8/1997 | Stultz | | 372/10 |
| 5,696,778 A | 12/1997 | Macpherson | | 372/4 |

(Continued)

OTHER PUBLICATIONS

Siegman, Anthony, "Lasers", 1986, University Science Books, 1007.*

(Continued)

*Primary Examiner*—Minsun Harvey
*Assistant Examiner*—Joshua King
(74) *Attorney, Agent, or Firm*—Allen, Dyer, Doppelt, Milbrath & Gilchrist, P.A.

(57) ABSTRACT

A non-linearly frequency-converted Q-switched laser is "injection seeded" with short pulses from another laser, called a seed laser. Radiation produced by the Q-switched laser is frequency converted in a non-linear process. The injection seeding can enhance peak power and frequency conversion efficiency while reducing damage to a non-linear medium used to frequency convert radiation generated by the Q-switched laser.

23 Claims, 3 Drawing Sheets

U.S. PATENT DOCUMENTS

| | | | |
|---|---|---|---|
| 5,767,969 A | 6/1998 | Chevalier | 356/350 |
| 5,802,083 A | 9/1998 | Birnbaum | 372/11 |
| 5,815,250 A | 9/1998 | Thomson et al. | 356/5.01 |
| 5,832,008 A | 11/1998 | Birnbaum et al. | 372/11 |
| 5,838,701 A * | 11/1998 | Deutsch et al. | 372/10 |
| 5,838,709 A | 11/1998 | Owa | 372/68 |
| 5,847,816 A | 12/1998 | Zediker et al. | 356/5.09 |
| 5,909,306 A | 6/1999 | Goldberg et al. | 359/337.1 |
| 5,974,060 A | 10/1999 | Byren et al. | 372/19 |
| 6,002,697 A * | 12/1999 | Govorkov et al. | 372/34 |
| 6,016,324 A * | 1/2000 | Rieger et al. | 372/25 |
| 6,356,128 B2 | 3/2002 | Suga et al. | 327/160 |
| 6,556,339 B2 | 4/2003 | Smith et al. | 359/334 |
| 6,654,391 B2 * | 11/2003 | Adams | 372/10 |
| 2001/0014131 A1 | 8/2001 | Mashimo et al. | 375/289 |
| 2002/0158211 A1 | 10/2002 | Gillispie | 250/458.1 |
| 2003/0030756 A1 * | 2/2003 | Kane et al. | 348/744 |
| 2003/0031215 A1 * | 2/2003 | Kane et al. | 372/10 |
| 2003/0035448 A1 * | 2/2003 | Yin | 372/22 |
| 2003/0048814 A1 | 3/2003 | Gross et al. | 370/359 |
| 2003/0118060 A1 | 6/2003 | Spuehler et al. | 372/18 |
| 2003/0179785 A1 * | 9/2003 | Kane | 372/10 |
| 2004/0233945 A1 * | 11/2004 | Komine et al. | 372/29.022 |

OTHER PUBLICATIONS

Saeed et al., "Optimization and characterization of a high repetition rate, high intensity Nd:YLF regenerative amplifier", Apr. 20, 1990, Applied Optics, 29, 12, 1752-1757.*

Norman P. Barnes and James C. Barnes, "Injection Seeding Theory", *IEEE Journal of Quantum Electronics*, vol. 29, No. 10, Oct. 1993.

G. J. Spuhler et al, Experimentally confirmed design guidelines for passively Q-switched microchip lasers sing semiconductor saturable absorbers, J. Opt. Soc. Am. B/ vol. 16, No. 3/Mar. 1999, pp. 376-388.

Schibli, et al., "Control of Q-Switched Mode Locking by Active Feedback,", Optics Letters, vol. 26, May 2001, pp. 692-694.

* cited by examiner

INJECTION SEEDING OF FREQUENCY-CONVERTED Q-SWITCHED LASER

FIELD OF THE INVENTION

This invention generally relates to lasers and more particularly to injection seeding of Q-switched lasers.

BACKGROUND OF THE INVENTION

Q-switched lasers are often based on Neodymium-doped Yttrium Aluminum Garnet (Nd:YAG) as the laser material. This material lases at several wavelengths including 1064 nanometers. Such lasers often have application not at the 1064-nm wavelength of Nd:YAG, but at the harmonics of Nd:YAG: 532 nm and 355 nm, and perhaps in the future at higher harmonics. Frequency converting crystals, e.g. Lithium Triborate (LBO) convert the 1064-nm fundamental radiation from the Nd:YAG to the higher harmonics. The efficiency of conversion to the harmonics is quite good at low (20 kHz and under) repetition rates, with the power at the harmonic being 50% or more of the power that can be achieved at the fundamental infra-red wavelength. However, in many laser applications, such as precision micro-machining, higher repetition rates, e.g., as high as 100 kHz and above are desired. Such high repetition rates allow removal of material in small increments, in a way that is cleaner and more precise than is possible at low repetition rates.

Unfortunately, at these high repetition rates, the efficiency of conversion to the harmonics is greatly reduced. A laser which can be specified at an average power of 10 Watts of 355 nm output at a repetition rate of 10 kHz can only provide 2 Watts at 200 kHz. It would be desirable to maintain the high efficiency over a much higher range of repetition rates.

In addition, at high repetition rates, the Q-switched pulses lengthen as well as decline in energy, so that the peak power of the laser is greatly reduced. For some applications, the peak power goes below the threshold at which materials processing can take place. It would be desirable to maintain a high peak power, even as the energy per pulse is reduced at high repetition rate.

In the unsaturated regime, efficiency of non-linear frequency conversion is proportional to peak power, and high peak power can result in higher conversion efficiency. The peak power can be enhanced by optical amplification. Unfortunately, amplification of a broadened pulse to high peak powers can damage non-linear materials used for frequency conversion.

Thus, there is a need in the art, for a laser system that overcomes the above disadvantages.

SUMMARY OF THE INVENTION

Embodiments of the present invention provide for efficient non-linear frequency conversion and high peak power at Q-switched repetition rates where conventional designs are greatly reduced in efficiency and peak power. A Q-switched laser is "injection seeded" with short pulses from another laser, called a seed laser. Radiation produced by the Q-switched laser is frequency converted in a non-linear process. The injection seeding can enhance peak power and frequency conversion efficiency while reducing damage to a non-linear medium used to frequency convert radiation generated by the Q-switched laser.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
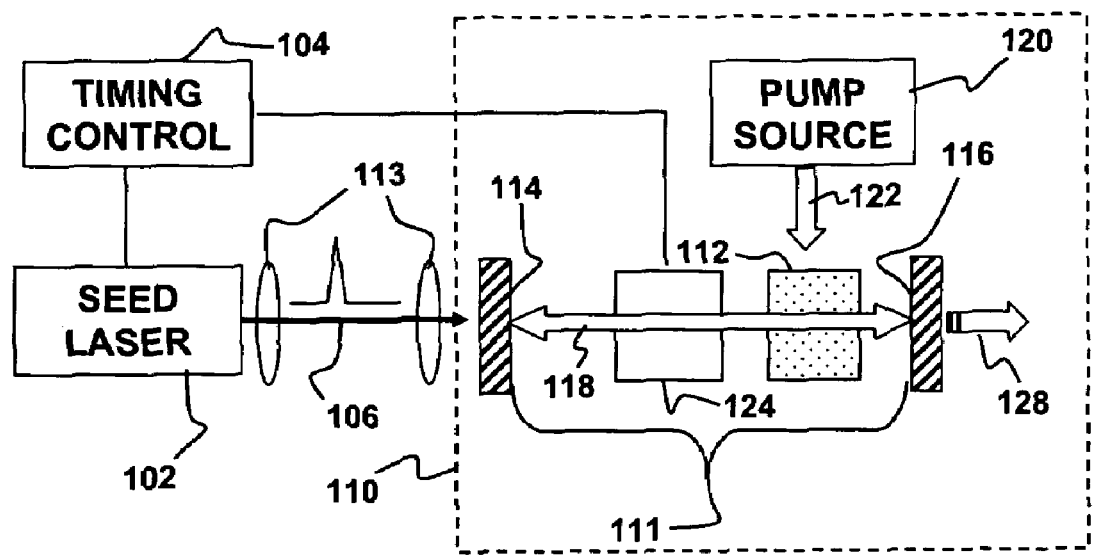
FIG. 1 is a block diagram of an injection seeded laser system according to an embodiment of the present invention.

Although the following detailed description contains many specific details for the purposes of illustration, anyone of ordinary skill in the art will appreciate that many variations and alterations to the following details are within the scope of the invention. In some of the examples described below certain assumptions have been made for the sake of illustration. Accordingly, the illustrative embodiments of the invention described below are set forth without any loss of generality to, and without imposing limitations upon, the claimed invention.

Glossary:

As used herein:

Cavity refers to an optical path defined by two or more reflecting surfaces along which light can reciprocate or circulate. Objects that intersect the optical path are said to be within the cavity.

Continuous wave (CW) laser: A laser that emits radiation continuously rather than in short bursts, as in a pulsed laser.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain Medium refers to a lasable material as described below with respect to Laser.

Includes, including, e.g., "such as", "for example", etc., "and the like" may, can, could and other similar qualifiers used in conjunction with an item or list of items in a particular category means that the category contains the item or items listed but is not limited to those items.

Infrared Radiation refers to electromagnetic radiation characterized by a vacuum wavelength between about 700 nanometers (nm) and about 5000 nm.

Laser is an acronym of light amplification by stimulated emission of radiation. A laser is a cavity that is filled with lasable material. This is any material—crystal, glass, liquid, dye or gas—the atoms of which are capable of being excited to a metastable state by pumping e.g., by light or an electric discharge. Light emitted by an atom as it drops back to the ground state stimulates other nearby excited atoms to similarly emit light. The light (referred to herein as stimulated radiation) is continually increased in intensity as it makes multiple round trips through the cavity. A laser may be constructed using an optical fiber as the gain medium. Fibers are typically glass-type materials, though may be crystalline or glass-nano-crystal composites.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns ($10^{-4}$ meters).

Mode-Locked Laser refers to a laser that functions by controlling the relative phase (sometimes through modulation with respect to time) of each mode internally to give rise selectively to energy bursts of high peak power and short duration, e.g., in the picosecond ($10^{-12}$ second) domain.

Non-linear frequency conversion refers to a class of optical phenomena that can typically be viewed only with nearly monochromatic, directional beams of light, such as those produced by a laser. Harmonic generation (e.g., second-, third-, and fourth-harmonic generation), optical parametric oscillation, sum-frequency generation, difference-frequency generation, optical parametric amplification, and the stimulated Raman effect are examples of non-linear frequency conversion.

Non-linear material refers to materials that possess a non-zero non-linear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiIO_3$ crystals, as well as quasi-phase-matched materials.

Phase-matching refers to the technique used in a multiwave non-linear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched.

Q refers to the figure of merit of a resonator (cavity), defined as $(2\pi)\times$(average energy stored in the resonator)/ (energy dissipated per cycle). The higher the reflectivity of the surfaces of an optical resonator and the lower the absorption losses, the higher the Q and the less energy loss from the desired mode.

Q-switch refers to a device used to rapidly change the Q of an optical resonator.

Q-switched Laser refers to a laser that uses a Q-switch in the laser cavity to prevent lasing action until a high level of inversion (optical gain and energy storage) is achieved in the lasing medium. When the Q-switch rapidly increases the Q of the cavity, e.g., with an acousto-optic or electrooptic modulator or saturable absorber, a giant pulse is generated.

Quasi-Phasematched (QPM) Material: In a quasi-phase-matched material, the fundamental and higher harmonic radiation are not phasematched, but a QPM grating compensates. In a QPM material, the fundamental and higher harmonic can have identical polarizations, often improving efficiency. Examples of quasi-phasematched materials include periodically-poled lithium tantalate, periodically-poled lithium niobate (PPLN) or PPKTP.

Vacuum Wavelength: The wavelength of electromagnetic radiation is generally a function of the medium in which the wave travels. The vacuum wavelength is the wavelength electromagnetic radiation of a given frequency would have if the radiation were propagating through a vacuum and is given by the speed of light in vacuum divided by the frequency.

Introduction:

According to embodiments of the invention, to attain high non-linear frequency conversion efficiency, the peak power of a non-linearly frequency-converted Q-switched laser can be enhanced by a technique known as "injection seeding". The theory of injection seeding with pulsed or continuous wave (cw) injection sources is described, e.g., in "Injection Seeding I: Theory" by Norman P. Barnes and James C. Barnes, published in the IEEE Journal of Quantum Electronics, vol.29, October 1993, page 2670, which is incorporated herein by reference. U.S. Pat. No. 4,914,663 to Basu et al. describes an example of injection seeding a moving slab Q-switched laser using a mode-locked laser as a seed source. However, non-linear frequency conversion of the injection-seeded output was not discussed.

In this technique pulses of radiation are injected into the cavity of the Q-switched laser to produce a "seeded" output pulse. Injection seeding can produce an output pulse that has the same energy as the un-seeded pulse, and the same overall duration. However, the seeded output pulse will consist of a group of short sub-pulses, with each short pulse having approximately the duration of the injected seed pulse. The time between sub-pulses is the time it takes light to make one round trip in the Q-switched resonator. If the injected pulse is short compared to the round-trip time, then the peak power of the seeded output pulse will be enhanced. This is due to the fact that the Q-switched pulse has the same overall duration and energy, but the sub-pulses are short compared to their separation. Thus to have the same total energy, the peak power of the seeded output pulse is greater.

FIG. 1 shows a schematic of an injection seeded laser system 100 according to an embodiment of the present invention. The system 100 generally includes a relatively low-power seed laser 102 an optional timing control 104 and a high-powered Q-switched laser 110. The Q-switched laser 110, has a gain medium 112 disposed within a cavity 111 defined by reflecting surfaces 114, 116. The gain medium 112 may be doped with dopant ions that provide a metastable state for lasing. Seed pulses of output radiation 106 from the seed laser 102 are coupled into the resonator cavity 111 of the Q-switched laser 110, e.g., by free space optics 113 or optical fibers. Preferably the seed pulses of output radiation 106 from the seed laser 102 are characterized by the same vacuum wavelength as the fundamental radiation 118. This can be fairly easily accomplished, e.g., if the seed laser 102 uses the same type of gain medium as the gain medium 112 of the Q-switched laser 110. The pulses of output radiation 106 are shorter in duration than a round trip time of the Q-switched laser 110. The round trip time is generally defined as twice the length of the cavity 111 divided by the speed of light.

The Q-switched laser 110 includes an active Q-switch 124 that facilitates generation of high-intensity radiation pulses e.g., using an electro-optic or acousto-optic modulator. The Q-switch 124 prevents lasing action until a high level of inversion (optical gain and energy storage) is achieved in the gain medium 112. When the switch 124 rapidly increases the Q of the cavity, a giant pulse of radiation is generated. The timing control 104 synchronizes the production of pulses from the seed laser 102 with the opening of the Q-switch 124. The timing control system 104 ensures that a seed pulse of radiation 106 from the seed laser 102 is present at the time when the Q-switch 124 is opening. There are a number of different schemes for synchronizing the arrival of the seed pulses as the Q-switch 124 is opening. For example, the seed laser 102 may produce a train of short seed pulses and the timing controller 104 may produce a signal that repetitively opens and closes an acousto-optic modulator used as an active Q-switch 124. Pulses that arrive as the Q-switch 124 is opening will be injected. Alternatively, in the case of a passive Q-switch, the timing control 104 may synchronize the production of a single pulse of radiation 106 from the seed laser 102 with the opening of the Q-switch 124 such that a single seed pulse from the seed laser 102 enters the resonator cavity with each opening of the Q-switch 124. This sequence can be repeated many times at repetition rates ranging, e.g., from about 20 kilohertz to about 1 Megahertz.

The cavity 111 is configured to support electromagnetic radiation 113, e.g., stimulated radiation from the gain medium 112, characterized by a fundamental frequency $\omega$. The cavity 111 may be configured, e.g., by choosing the dimensions (e.g. radii), reflectivities, curvature and spacing of the reflectors 114, 116 such that the cavity 111 is a resonator capable of supporting radiation of the fundamental frequency $\omega$. Although a linear cavity 111, having two reflecting surfaces is depicted in FIG. 1, those of skill in the art will be able to devise other cavities, e.g., having stable, unstable, 3-mirror, 4-mirror Z-shaped, 5-mirror W-shaped, cavities with more legs, ring-shaped, or bowtie configurations being but a few of many possible examples. The cavity 110 includes an injection port through which the pulses of seed radiation 106 can be injected. For example, one of the reflecting surfaces 114 may be partially transmissive to the seed pulses of radiation 106 from the seed laser 102. Alternatively In addition, those of skill in the art will be able to devise other injection ports for the pulses of radiation 106 and output ports for the output radiation 128. Any suitable injection port configuration may be used provided the seed pulses 106 travel along the same axis as the fundamental radiation 118 within the cavity 111. For example, depending on the design of the Q-switched laser 110, the other reflecting surface 116 may also be partially transmissive to allow some of the fundamental radiation 118 (or other internal radiation) to exit the cavity as output radiation 128. Alternatively, one of the reflecting surfaces 114, 116 may be partially transmissive and serve as both an injection port and an output port. In addition, depending on the design of the Q-switch 124 it may be also possible to inject the seed pulses 106 into the cavity 111 through the Q-switch 124. Injection seeding using the Q-switch 124 as an injection port is possible, e.g., where an acousto-optic modulator is used in the Q-switch 124. Those of skill in the art will be able to devise other ways of injecting seed pulses 106 into and coupling output radiation 128 out of the cavity 111.

The gain medium 112 is preferably a solid-state material, such as a crystalline material or a glass. The gain medium 112 can have a length of between about 1 mm and about 200 mm if it is crystalline or bulk glass in nature. If the gain medium is a fiber, then it is typically much longer, from about 0.1 meters to several hundred meters. Preferable crystalline materials include fluoride crystals, such as yttrium lithium fluoride (YLF) and oxide crystals. Examples of suitable oxide crystals include YALO (YAlO$_3$), yttrium orthovanadate (YVO$_4$) and garnets. Suitable garnets include yttrium aluminum garnet (YAG), gadolinium gallium garnet (GGG), gadolinium scandium gallium garnet (GSGG), and yttrium scandium gallium garnet (YSGG). A preferred garnet is YAG, which can be doped with different ions. Preferred doped YAG crystals include Tm:Ho:YAG, Yb:YAG, Er:YAG and Nd:YAG. By way of example, the gain medium may be Neodymium-doped Yttrium Aluminum Garnet (Nd:YAG) that produces radiation characterized by a fundamental frequency $\omega$ corresponding to a vacuum wavelength of about 1064 nm. In alternative embodiments, the fundamental frequency $\omega$ can correspond to a vacuum wavelength of about 946 nm or 1319 nm. Nd:YAG and other gain media are commercially available, e.g., from Scientific Materials of Bozeman, Mont.

The gain medium 112 may have two end surfaces through which the fundamental radiation 113 passes. The end surfaces of the gain medium 112 may be normal (perpendicular) or near normal to the direction of propagation of the fundamental radiation 113 as shown in FIG. 1. Alternatively, the end surfaces may be situated at a Brewster's angle $\theta_B$ relative to the fundamental radiation 113, such that the fundamental radiation 113 is p-polarized with respect to the end surfaces, i.e. polarized in the plane of the plane of incidence of the fundamental radiation 113. Alternatively, end surfaces may be polished at some other angle.

The gain medium 112 may be pumped (e.g., end-pumped or side-pumped) by an external source 120 of pumping energy 122. An interaction between the pumping energy 122 and the gain medium 122 produces the radiation 123. As such, the radiation 123 is, at least initially, internal radiation. The pumping energy 122 may be in the form of radiation introduced through one or more sides and/or ends of the gain medium 122. In a preferred embodiment, the external source 120 is a diode laser, in which case the laser 110 would be a diode-pumped laser. The pumping radiation 122 can have a vacuum wavelength ranging from about 650 nm to about 1550 nm. For Nd:YAG, the pumping radiation is typically at a vacuum wavelength of about 808 nm or about 880 nm.

When the Q-switched laser 110 operates in its "free-running" state, with no injected pulse, the output radiation 128 may be characterized by efficiency, pulse-to-pulse stability, or peak power that are less then what is desired. Injection seeding the gain medium 112 with pulses of radiation 106 from the seed laser 102 improves the pulse-to-pulse stability and enhances the peak power, which improves the conversion efficiency of the output of the Q-switched laser 110. If the power of the injected pulse of output radiation 106 is adequate (a few nanojoules will be ample) and if the timing synchronization is adequate (the timing tolerance will be a few round trips of the cavity 111, e.g., several nanoseconds) then the output of the Q-switched laser 110 will consist of a group of sub-pulses, each with the duration of the injected pulse 106, with time between sub-pulses equal to the round-trip-time of the Q-switched resonator, and with non-linear conversion efficiency, peak power, or pulse-to-pulse stability improved from the free-running case.

Figure 2:
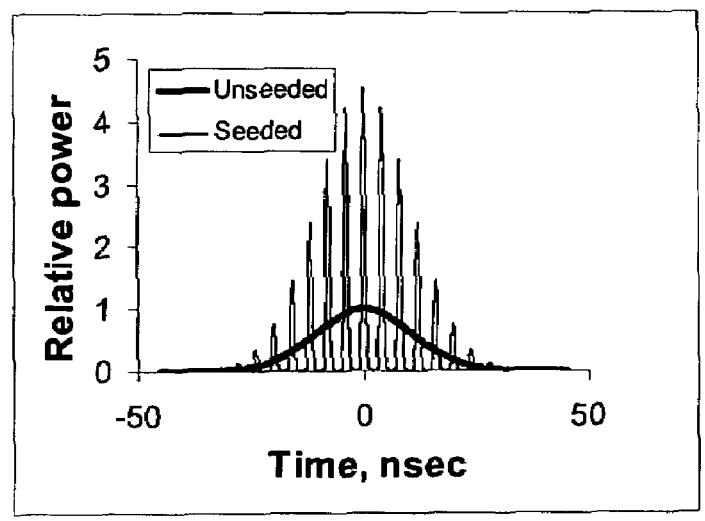
FIG. 2 is a graph showing temporal pulse shape for a Q-switched laser with and without injection seeding.

FIG. 2 illustrates an example of a simple case of peak power enhancement with injection seeding. Pulses which were simple Gaussians in time were assumed both for the Q-switched pulse and the injected pulse. The Q-switched pulse has a full-width-at-1/e-power of 30 nsec. The injected pulse duration is 500 psec. The round-trip-time is 4 nsec. This combination of factors leads to a peak power for the seeded pulse which is 4.5 times that of the un-seeded pulse. Thus, injection seeding with single pulses from the seed laser 102 can produce a frequency conversion efficiency or peak power that is at least twice as large as that attainable in free-running (i.e., non-injection seeded) operation of the Q-switched laser 110.

Figure 3:
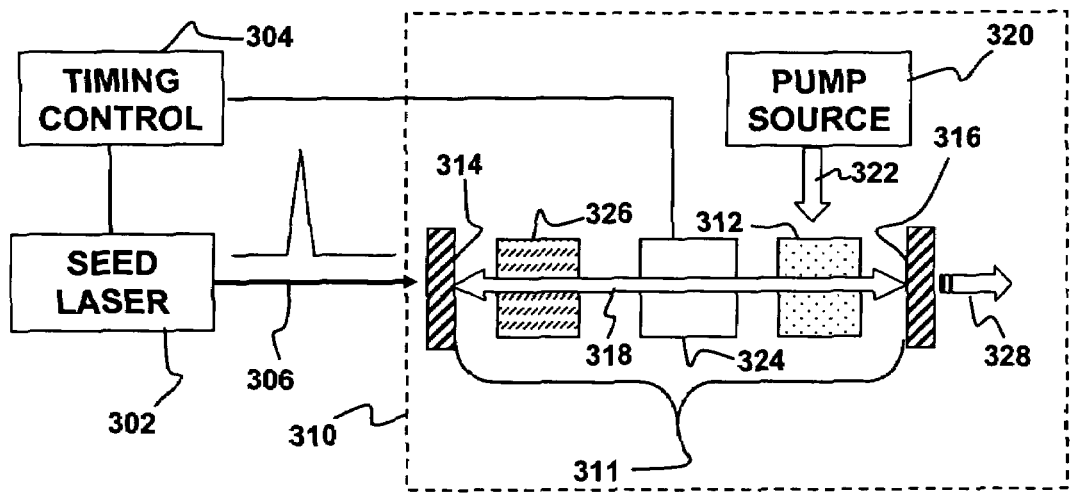
FIG. 3 is a block diagram of an internally frequency converted laser system according to an embodiment of the present invention.

A very desirable laser type for the seed laser 102 is one that has pulses that can be chosen from a wide range of pulse durations. Only pulses substantially shorter than the round-trip-time of the cavity 111 are useful for seeding. However, pulses that are too short can lead to peak power so high that optical damage occurs. For a typical Q-switched laser, the round-trip time is about 4 nsec. Injection seeding with pulses with 0.22 nsec duration can potentially increase peak power by approximately 10×. This is a desirable increase, enough to substantially increase frequency conversion without causing damage to a non-linear frequency converting medium. For example, for a pulse of a given peak power, the level of damage to common non-linear crystals scales approximately as the square root of the pulse duration. Thus, the relatively short duration for the sub-pulses that make up the seeded pulse from the Q-switched laser 110 can significantly reduce damage to a non-linear frequency converting medium that would otherwise be associated with high peak powers. Consequently, injection seeding of frequency-converted Q-switched lasers can enhance conversion efficiency while reducing damage to the frequency converting medium Frequency Converted Injection-Seeded Lasers For the reasons discussed above, embodiments of the present invention are particularly applicable to Q-switched frequency converted lasers. The frequency conversion may be performed within the cavity of the Q-switched laser (intracavity) or outside the cavity (extra-cavity). FIG. 3 depicts an example of an injection-seeded Q-switched, intracavity frequency-converted laser system 300 according to an embodiment of the invention. The system 300 includes a seed laser 302 an optional timing control 304 and Q-switched laser 310. The Q-switched laser 310 has an optical cavity 311 defined between reflecting surfaces 314, 316. The cavity 311 may have any of the configurations described above. A gain medium 312 and Q-switch 324 are located within the cavity 311 as described above with respect to FIG. 1. The gain medium 312 is pumped with pumping radiation 322 from a source 320. The timing control 304 synchronizes the production of seed pulses of radiation 306 from the seed laser 302 with the opening of the Q-switch 324 as described above. The seed pulses trigger pulsed production of fundamental radiation 318 from the gain medium 312 as described above.

A non-linear material 326 is also placed inside the resonator cavity 311. The non-linear material 326 may be a crystal that is phase-matched for a particular non-linear frequency conversion process that converts some fundamental radiation 318 of frequency ω produced by the gain medium 312 to output radiation 328 characterized by one or more frequencies that are different from ω. The high peak powers of the pulses of fundamental radiation 318 that are possible with injection seeding as described herein allow for highly efficient frequency conversion by the non-linear material 326.

Examples of such non-linear frequency conversion process include, but are not limited to, e.g., second-, third-, and fourth-harmonic generation, optical parametric oscillation, sum-frequency generation, difference-frequency generation, optical parametric amplification, and the stimulated Raman effect. The non-linear material 312 may be any suitable material for the desired non-linear process. Examples of such materials include crystals of lithium Niobate ($LiNbO_3$), lithium triborate (LBO), beta-barium borate (BBO), cesium lithium borate (CLBO), lithium tantalite, KTP, ADA, ADP, CBO, DADA, DADP, DKDP, DLAP, DRDP, KABO, KDA, KDP, LB4, or LFM and isomorphs thereof, periodically poled materials such as periodically poled lithium Niobate (PPLN) and periodically poled lithium tantalate. Such non-linear materials are available commercially, e.g., from Fujian Castech Crystals of Fujian, China.

Phase matching of the non-linear material 312 may be adjusted by changing its temperature or angle. Those of skill in the art will be able to devise intracavity frequency-converted lasers for various non-linear processes. Particular examples of intracavity frequency-tripled lasers are described in detail, e.g., in commonly-assigned U.S. Pat. No. 5,850,407, which is incorporated herein by reference. Particular examples of intracavity frequency quadrupled lasers are described in detail, e.g., in commonly-assigned U.S. Pat. No. 6,697,391, which is incorporated herein by reference.

Figure 4:
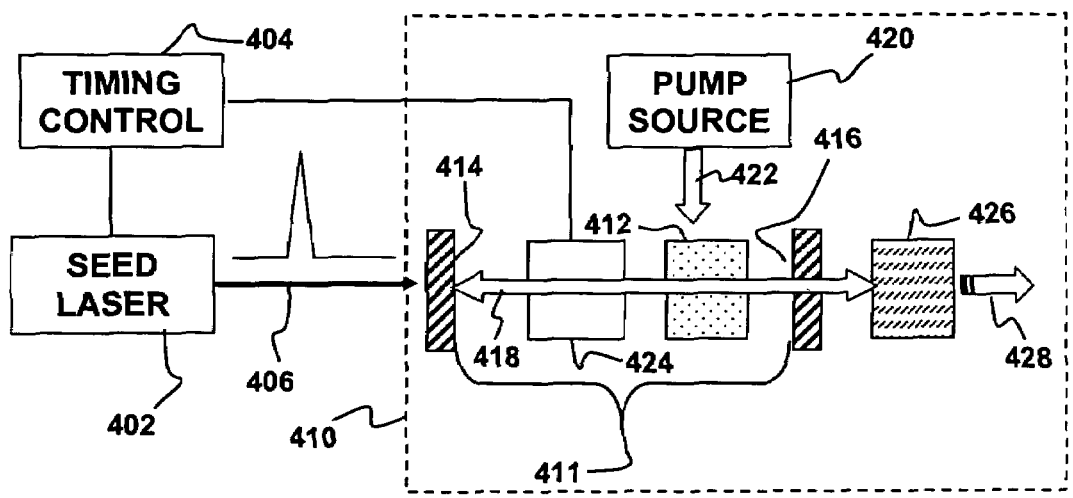
FIG. 4 is a block diagram of an externally frequency converted laser system according to an embodiment of the present invention.

Injection seeding as described herein may also significantly improve the pulse-to-pulse stability of externally frequency converted lasers because the mode structure of the infrared pulse is constant from pulse to pulse. FIG. 4 depicts an example of an externally frequency-converted laser system 400 having a seed laser 402 timing control 404 and Q-switched laser 410. The Q-switched laser 410 has an optical cavity 411 defined between reflecting surfaces 414, 416. The cavity 411 may have any of the configurations described above. A gain medium 412 and Q-switch 424 are located within the cavity 411 as described above with respect to FIG. 1. Pumping radiation 422 from a source 420 pumps the gain medium 412. Seed pulses of radiation 406 from the seed laser 402 trigger production of pulses of fundamental radiation 418 from the gain medium 412 as described above. The timing control 404 synchronizes the production of pulses of radiation 406 from the seed laser 402 with the opening of the Q-switch 424 as described above.

A non-linear material 426, e.g., of any of the types described above, is located outside the resonator cavity 411. One of the reflecting surfaces 416 is partially transmissive to pulses of fundamental radiation 418, which are coupled to the non-linear material 426. A non-linear process in the non-linear material 426 frequency converts the pulses of fundamental radiation to produce frequency converted output radiation 428.

Many different types of pulsed lasers may be used as the seed laser 102, 302 or 402. Examples of suitable pulsed lasers include, but are not limited to pulse-selected mode-locked lasers, passively Q-switched lasers, actively Q-switched lasers, or pulsed diode lasers. In certain embodiments, a passively-Q-switched laser (PQSL) may be used as the seed lasers in systems of the types shown in FIGS. 1, 2 and 3. A passively Q-switched laser uses a saturable absorber in one of the reflectors of the laser cavity. The function of the saturable absorber provides an amount of loss that keeps the PQSL from lasing most of the time, but which disappears once the PQSL begins to lase. When the loss disappears the PQSL can efficiently emit a powerful pulse after the loss is "saturated." Once the pulse is emitted, the saturable absorber returns to its lossy state. PQSLs are small and inexpensive, yet can provide adequate power for seeding, with pulse durations that can be selected over the range from 37 psec to over 1 nsec. PQSL technology is described, e.g., by G. J. Spuhler et al. in "Experimentally Confirmed Design Guidelines for Passively Q-Switched Microchip Lasers Using Semiconductor Saturable Absorbers," Journal of the Optical Society of America B, Vol. 16, No. 3, March 1999 pp 376-388, the disclosures of which are incorporated herein by reference.

Injection-seeding with a cw single-frequency pulse is a well-known approach to improving the stability of frequency conversion of a Q-switched laser. A PQSL is a pulsed "single-frequency" laser, with a very stable spectrum from pulse to pulse. The resulting output of the seeded Q-switched laser will not be single-frequency, and in fact will be indistinguishable from a "mode-locked Q-switched" laser. However, the output mode spectrum will be very stable from pulse-to-pulse, and that is what determines pulse energy stability.

A PQSL can be synchronized so that the pulse arrives at the Q-switched laser when the Q-switch is opening, which is the proper time for effective seeding to take place. Specifically, a Q-switched laser can be used as a voltage controlled oscillator in a phase-locked loop control circuit. A reference oscillator of the phase-locked loop control circuit can control both the pulsing of the PQSL used for seeding and the Q-switch of the laser that is seeded. Such phase-locked loop control is based on the observation that the pulse repetition rate of PQSL depends on the pump power provided to the PQSL's gain medium. Thus, a PQSL is equivalent to a voltage controlled oscillator (VCO). Voltage controlled oscillators can be used to create phase-locked loops. Thus, it is possible to lock the frequency and phase of the pulses created by the PQSL to a reference oscillator. The pulse frequency response of the PQSL is a monotonic function of the applied pump power over much of its operating range, allowing the loop to be closed. Examples of such phase locked PQSL systems are described e.g., in commonly assigned US Patent Application Publication 20030179785.

Figure 5:
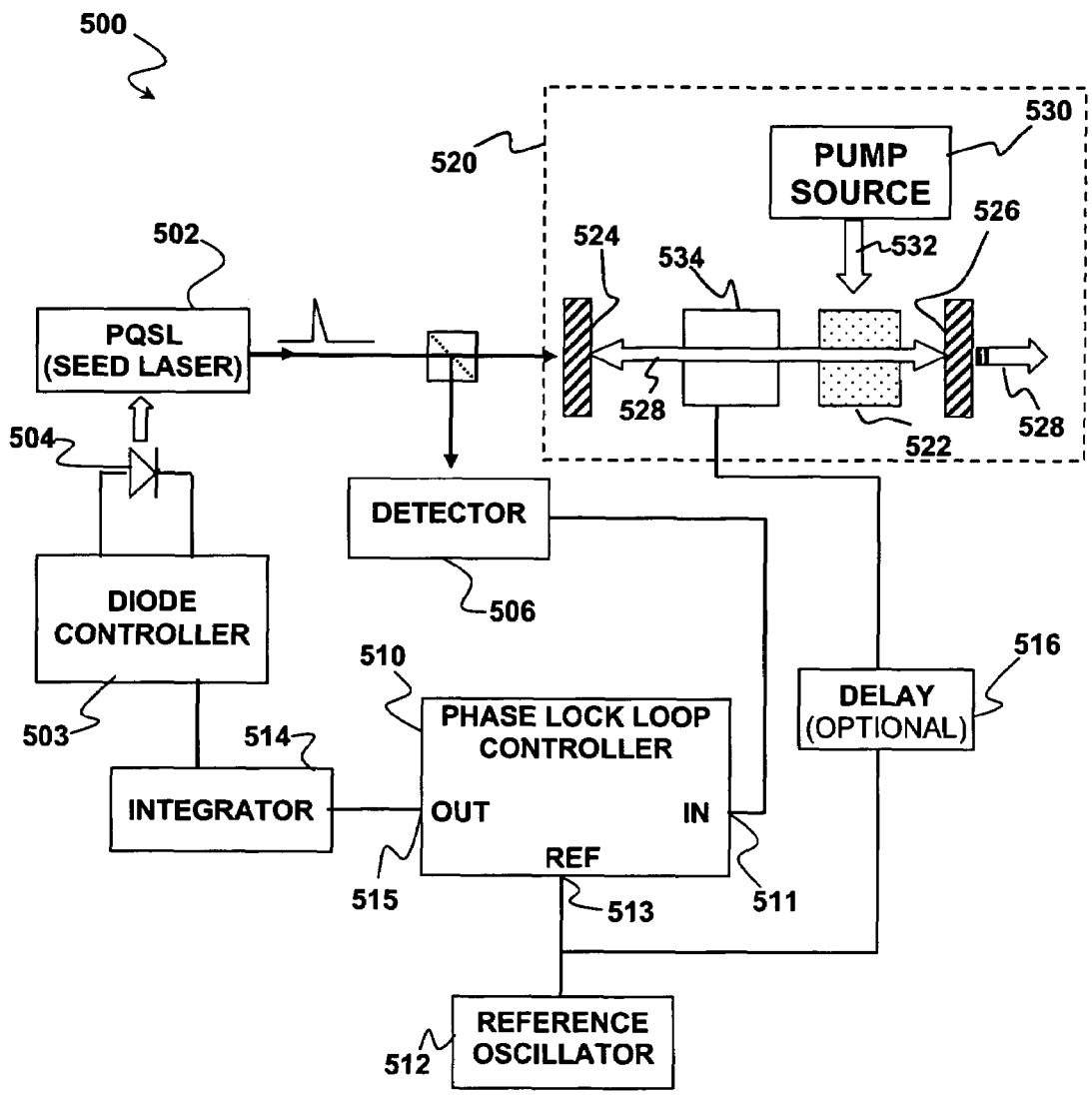
FIG. 5 is a schematic diagram of an injection seeded laser system having a PQSL seed laser synchronized to a Q-switch of a seeded laser using a phase locked loop control scheme according to an embodiment of the present invention.

FIG. 5 depicts an example of an injection seeded laser system 500 that utilizes a phase locked loop control circuit to synchronize the production of pulses in a seed laser with the opening of a Q-switch in a Q-switched laser. The system generally includes a PQSL 502, a Q-switched laser 520 and a timing control circuit. By way of example, the PQSL 502 may be a model ML-00005 laser from Synoptics of Charlotte, N.C. operating at 1064 nm. The timing control circuit may include a laser diode 504 that provides pumping power to the PQSL 502. By way of example, the laser diode 504 may be built into the Synoptics PQSL package. The PQSL 502 and diode 504 operate under the control of a controller 503. In a particular embodiment, a Model 110 laser controller from Lightwave Electronics of Mountain View, Calif., may be used to control the diode current and temperature. Alternatively, the PQSL may be powered with a commercial diode current controller such as a Model 6000 Laser Diode Controller available from Newport Corporation of Irvine, Calif.

Most of the output from the PQSL 502 is coupled to the Q-switched laser 520 for injection seeding as described herein. The Q-switched laser 520 generally includes a gain medium 522 and Q-switch 534 within an optical cavity defined by reflecting surfaces 524, 526. A pumping source 530 provides pumping radiation 532 to the gain medium 522. The combination of pumping and injection seeding causes the gain medium 522 to produce pulses of fundamental radiation 518.

A part of the output of the PQSL 502 is optically coupled to a detector 506. The detector 506 is coupled to an input 511 of a phase lock loop controller 510. The Phase Locked Loop controller 510 may be implemented on a Programmable Logic Device (PLD) available from Altera Corporation of San Jose, Calif. A suitable program such as PLL may implement the phase control in the Phase Locked Loop Controller 510. A reference oscillator 512 is coupled to a reference input 513 of the phase lock loop controller 510. The reference oscillator 512 produces a pulse train that is used to trigger the pulsing of the PQSL 502. The pulse train from the reference oscillator 512 is also coupled to the Q-switch 534. An optional tunable delay 516 may be coupled between the reference oscillator 512 and Q-switch 534. The delay allows for adjustment of the timing of the opening of the Q-switch 534 relative to the pulsing of the PQSL 502.

An integrator 514 is coupled to an output 515 of the phase lock loop controller 510. The integrator 514 may be implemented with generic operational amplifier circuitry. The integrator 514 is coupled to the controller 503, which controls an amount of pump power that the laser diode provides to the PQSL. In some applications, the detector may optionally include a divide-by-2 flip-flop that receives a pulse train characterized by a pulse frequency f and produces an output pulse train characterized by a pulse frequency f/2. Alternatively, an external divide-by-2 flip-flop may be coupled between the detector 506 and the input 511 of the phase lock loop controller 510.

The system 500 operates as follows. The controller 503 controls a current to the laser diode 504, which in turn controls the amount of pumping power provided to the PQSL 502 by the laser diode 504. The diode controller 503 allows the current supplied to the diode 504 to be controlled by a voltage applied to the controller 503. The integrator 514 creates a voltage that is applied to the diode controller 513. The voltage from the integrator 514 controls the current supplied to the laser diode 504. The laser diode current controls the power from the laser diode 504. The power from the laser diode 504 determines the pulse repetition rate of the PQSL 502. In the embodiment depicted in FIG. 5, the control at each step is roughly linear. Thus the combination of the controller 513, the laser diode 504 and PQSL 502 is equivalent to a Voltage Controlled Oscillator. Thus, the pulse repetition frequency of the PQSL 502 depends on the current driven through the laser diode 504. The timing of pulses from the PQSL 502 is controlled relative to the pulse train from the reference oscillator 512. The pulses from the PQSL 502 can be synchronized with the pulse train from the reference oscillator 512. The same pulse train from the reference oscillator 512 also controls the opening of the Q-switch 534. Thus, the seed pulses from the PQSL 502 can be synchronized with the opening of the Q-switch 534, e.g., by adjusting the tunable delay 516, such that a single seed pulse from the PQSL 502 enters the resonator cavity with each opening of the Q-switch 534.

Figure 6:
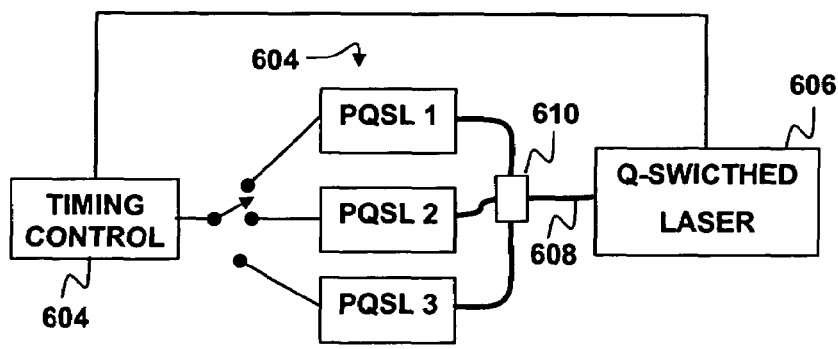
FIG. 6 is a schematic diagram of an injection seeded laser system having multiple PQSL seed lasers according to an alternative embodiment of the present invention.

Passively Q-switched lasers are also advantageous seed sources due to their compact size and relatively low cost. A common drawback to both mode-locked lasers and PQSLs as seed sources is that it is difficult to vary the pulse width without redesigning the laser. The large size and high cost of mode-locked lasers makes it impractical to use multiple mode locked lasers to provide different pulse widths. However, as shown in FIG. 6, the low cost and compact size of a PQSL makes it both practical and cost-effective to provide a system 600 with multiple PQSLs 602 configured to have different pulse widths and selectively couple them to the cavity of a Q-switched laser 606, which may be non-linearly frequency converted, e.g., either internally or externally. A timing control 604 is coupled to the Q-switch of the seeded laser 606 and can be selectively coupled to each of the PQSLs 602, e.g., by a switch. The PQSLs 602 can be removably optically coupled to the cavity of the seeded laser 606 via optical fibers 608. Alternatively, removable optical connection can be achieved via free space optics. In some embodiments, each PQSL may be removable by disconnecting it from a fiber. Alternatively, as shown in FIG. 6, the different PQSLs may be optically coupled to an optical combiner 610 and different PQSLs may be selectively coupled to the seeded laser 606 simply by turning them on or off.

Embodiments of the invention are particularly useful, e.g., when frequency conversion is critical to laser performance. It will also be useful when the desired output is infrared, but when higher peak power is needed, in order to reach some threshold for material processing.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for operating a laser to be seeded having a resonant cavity, the resonant cavity of the laser to be seeded being characterized by a round-trip time, and having a gain medium and a Q-switch disposed within the resonant cavity of the laser to be seeded, the method comprising the steps of: a) producing a single seed pulse with a pulsed seed laser external to the resonant cavity of the laser to be seeded, wherein the pulse length of the seed pulse is shorter than the round-trip time of the resonant cavity of the laser to be seeded, wherein the pulsed seed laser is a pulse-selected mode-locked laser, a passively Q-switched laser (PQSL), an actively Q-switched laser, or a pulsed diode laser, and wherein the pulsed seed laser has a resonant cavity and at most one optical shutter disposed therein; b) opening the Q-switch of the laser to be seeded; c) injection seeding the resonant cavity of the laser to be seeded with only the single seed pulse to produce radiation; and d) non-linearly frequency converting the radiation produced by the gain medium as a result of injection seeding the resonant cavity of the laser to be seeded with the single seed pulse.

2. The method of claim 1 wherein steps a)-d) are repeated at a repetition rate of between about 20 kilohertz and about 1 megahertz and wherein only a single seed pulse is injected into the resonant cavity of the laser to be seeded each time the Q-switch of the laser to be seeded opens.

3. The method of claim 1 wherein non-linearly frequency converting the radiation produced by the gain medium includes generating higher harmonics of the radiation produced by the gain medium.

4. The method of claim 1 wherein, as a result of injection seeding the resonant cavity of the laser to be seeded with the single seed pulse, the radiation produced by the gain medium is characterized by a plurality of sub-pulses, each of which has a duration approximately equal to that of the single seed pulse.

5. The method of claim 1 wherein injection seeding the resonant cavity of the laser to be seeded with the single seed pulse produces a frequency conversion efficiency or peak power of the radiation produced by the gain medium that is at least twice as large compared to free-running operation of the laser to be seeded.

6. The method of claim 1 wherein the pulsed seed laser is a PQSL, the PQSL being characterized by a pulse repetition rate, further comprising the step of synchronizing the production of the single seed pulse to the opening of the Q-switch of the laser to be seeded so that only the single seed pulse arrives at the resonant cavity of the laser to be seeded when the Q-switch of the laser to be seeded is opening.

7. The method of claim 6 wherein the step of synchronizing the production of the single seed pulse to the opening of the Q-switch of the laser to be seeded includes controlling the pulse repetition rate of the PQSL by using the PQSL as a voltage controlled oscillator in a phase-locked loop control circuit.

8. The method of claim 7 wherein the PQSL is pumped by a source of pump power, and wherein the phase-locked loop control circuit controls the pulse repetition rate of the PQSL by controlling the amount of pump power provided to the PQSL.

9. The method of claim 1 wherein injection seeding the resonant cavity of the laser to be seeded with the single seed pulse includes injecting only the single seed pulse through the Q-switch of the laser to be seeded or through a reflecting surface of the resonant cavity of the laser to be seeded.

10. The method of claim 1 wherein non-linearly frequency converting the radiation produced by the gain medium takes place within the resonant cavity of the laser to be seeded.

11. The method of claim 10 wherein non-linearly frequency converting the radiation produced by the gain medium includes generating higher harmonics of the radiation produced by the gain medium.

12. The method of claim 1 wherein non-linearly frequency converting the radiation produced by the gain medium takes place outside the resonant cavity of the laser to be seeded.

13. An injection seeded laser system, comprising: a laser to be seeded having a resonant cavity, the resonant cavity of the laser to be seeded being characterized by a round-trip time, and having a gain medium and a Q-switch disposed within the resonant cavity of the laser to be seeded; a pulsed seed laser, external to the resonant cavity of the laser to be seeded, that is configured to produce a single seed pulse, wherein the pulse length of the seed pulse is shorter than the round-trip time of the resonant cavity of the laser to be seeded, wherein the pulsed seed laser is a pulse-selected mode-locked laser, a passively Q-switched laser (PQSL), an actively Q-switched laser, or a pulsed diode laser, and wherein the pulsed seed laser has a resonant cavity and at most one optical shutter disposed therein; a port through which to inject only the single seed pulse from the pulsed seed laser into the resonant cavity of the laser to be seeded to seed the gain medium to produce radiation; means for opening the Q-switch of the laser to be seeded; and a frequency converting medium optically coupled to the resonant cavity of the laser to be seeded.

14. The system of claim 13 wherein injection seeding the resonant cavity of the laser to be seeded with the single seed pulse from the pulsed seed laser produces a frequency conversion efficiency or peak power of the radiation produced by the gain medium that is at least twice as large compared to free-running operation of the laser to be seeded.

15. The system of claim 13 wherein the frequency converting medium is located within the resonant cavity of the laser to be seeded.

16. The system of claim 15 wherein the frequency converting medium is configured to generate higher harmonics of the radiation produced by the gain medium.

17. The system of claim 13 wherein the frequency converting medium is located outside the resonant cavity of the laser to be seeded.

18. The system of claim 13 wherein the gain medium is a Neodymium-doped solid state material.

19. The system of claim 18 wherein the gain medium is Neodymium-doped Yttrium Aluminum Garnet (Nd:YAG).

20. The system of claim 13 wherein the pulsed seed laser is a PQSL, further comprising a timing controller configured to synchronize the production of the single seed pulse to the opening of the Q-switch of the laser to be seeded so that only the single seed pulse is injected into the resonant cavity of the laser to be seeded when the Q-switch of the laser to be seeded is opening.

21. The system of claim 20 wherein the timing controller includes a phase locked loop control circuit that uses the pulsed seed laser as a voltage controlled oscillator.

22. The system of claim 13 wherein the pulsed seed laser is a PQSL, further comprising one or more additional pulsed seed lasers, wherein each pulsed seed laser is a PQSL configured to produce single seed pulses of different pulse widths and of about the same wavelength as the fundamental wavelength of the laser to be seeded, wherein each pulsed seed laser is adapted to be removably optically coupled to the resonant cavity of the laser to be seeded via the coupling optics.

23. The system of claim 13 wherein, as a result of injection seeding the resonant cavity of the laser to be seeded with the single seed pulse, the radiation produced by the gain medium is characterized by a plurality of sub-pulses, each of which has a duration approximately equal to that of the single seed pulse, wherein the time between sub-pulses is equal to the round-trip-time of the resonant cavity of the laser to be seeded.

* * * * *